United States Patent [19]

Collins

[11] Patent Number: 4,897,923
[45] Date of Patent: Feb. 6, 1990

[54] AUTOMATIC LINE FEED HEAD APPARATUS FOR A FLEXIBLE LINE TRIMMER OR THE LIKE

[75] Inventor: Imack L. Collins, Shreveport, La.

[73] Assignee: White Consolidated Industries, Inc., Cleveland, Ohio

[21] Appl. No.: 287,388

[22] Filed: Dec. 20, 1988

Related U.S. Application Data

[63] Continuation-in-part of Ser. No. 908,214, Sep. 17, 1986, Pat. No. 4,835,867, which is a continuation-in-part of Ser. No. 631,000, Jul. 16, 1984, which is a continuation of Ser. No. 245,459, Mar. 19, 1981, abandoned, which is a continuation of Ser. No. 891,666, Mar. 30, 1978, abandoned.

[51] Int. Cl.$^4$ ................................................. B26B 7/00
[52] U.S. Cl. ..................................... 30/276; 29/898.07; 30/347; 384/292
[58] Field of Search .................... 30/276, 347; 56/12.5, 56/12.7; 384/292; 29/149.5 R, 149.5 C, 149.5 S

[56] References Cited

U.S. PATENT DOCUMENTS

| | | | |
|---|---|---|---|
| 425,569 | 4/1890 | Gare | 384/292 |
| 1,454,682 | 5/1923 | Layne | 384/292 |
| 4,236,312 | 12/1980 | Foster et al. | 30/276 |
| 4,366,622 | 1/1983 | Lombard | 30/276 |
| 4,607,431 | 8/1986 | Gay | 30/276 |

FOREIGN PATENT DOCUMENTS

29433 4/1910 United Kingdom ................ 384/292

Primary Examiner—Douglas D. Watts
Attorney, Agent, or Firm—Hubbard, Thurman, Turner, Tucker & Harris

[57] ABSTRACT

A flexible line trimmer is provided with an automatic line feeding cutting head portion which utilizes a generally U-shaped, centrifugally actuated balancing arm member to maintain the free end cutting length of the line at a predetermined length during trimmer operation. The balancing arm is rotatably mounted within the head by means of a coil spring element which is installed on one of the leg portions of the balancing arm and press-fitted into a plastic pocket portion of the head to serve as a bearing for the balancing arm. The outer end of the spring-carrying leg has a transverse pigtail portion which may be selectively sized to predeterminably vary the controlled cutting length of the line. The opposite leg of the balancing arm, which is engaged by the line during trimmer operation, is received within spool flange notches when the arm is in its line locking position to prevent undesirable bending of the arm due to cutting line forces thereon.

19 Claims, 4 Drawing Sheets

AUTOMATIC LINE FEED HEAD APPARATUS FOR A FLEXIBLE LINE TRIMMER OR THE LIKE

CROSS-REFERENCE TO RELATED APPLICATIONS

This application is a continuation-in-part of U.S. application Ser. No. 908,214 now U.S. Pat. No. 4,835,867 which was filed on Sept. 17, 1986 and is hereby incorporated herein by reference. U.S. application Ser. No. 908,214 was a continuation-in-part of U.S. application Ser. No. 631,000 filed on July 16, 1984, which was a continuation of abandoned U.S. application Ser. No. 245,459 filed on Mar. 19, 1981 which, in turn, was a continuation of abandoned U.S. application Ser. No. 891,666 filed on Mar. 30, 1978.

BACKGROUND OF THE INVENTION

The field of art to which the invention relates includes apparatus for the cutting of vegetation, and more particularly to the cutting of vegetation using a flexible, non-metallic cutting line extending from a rotating head into a cutting plane.

Various types of devices have been proposed to facilitate the removal of vegetation by mowing, trimming, edging and like cutting operations. In general, these devices have employed a metal blade to effect vegetation removal. Devices of this nature employ prime movers such as electric and gasoline motors. As a result, rotating metal blades can inflict serious and terrible injury upon the user.

In about 1960, there was developed in Europe a trimmer/edger unit employing a flexible polymeric line extending from a rotating head for cutting vegetation. This unit did not work properly because of several defects in structure and operating parameters. In the United States of America, practical vegetation cutting devices using flexible, non-metallic lines carried upon a rotating head were developed. The devices are shown in U.S. Pat. Nos. 3,708,967, 3,826,068, 3,859,776, 4.035,912, 4,052,789, 4,054,992 and 4,067,108. These patented devices have met with outstanding success in that these American developments provide safe electrical or gasoline-powered tools for vegetation cutting, edging and trimming operations.

The devices shown in the mentioned patents employ a flexible cutting line, such as manufactured from Nylon polymer. The cutting line is carried usually upon a spool internally of a rotating head. When desired to replenish the line or to extend an additional length of line, the rotation of the head was stopped and line manually extended from the spool. This line extension procedure in the patented devices has been found to be convenient, simple and reliable. In many of the more powerful devices, especially those powered by electric motors, a system to extend the cutting line from the head without interrupting cutting operations has long been sought.

A most desirable system would be one capable of feeding cutting line from the head automatically as need was incurred independent of any operator involvement. Structures directed toward this purpose are shown in U.S. Pat. Nos. 3,895,440, 4,020,550 and 4,035,915. These structures have, in common, a basket weave supply of cutting line carried on the periphery of a disc with the line feeding from behind special post members. These post members have a cutting-abrading edge so that cutting line from the weave supply is bent about such edge in the free traveling end portion extending into the cutting plane. The combination function of the edge, line, angular speed, etc. is arranged so that the line posts with such edge sever the free end of the cutting line when it is worn to an ineffective length. In practice, these structures are found to waste about 25 percent of the cutting line because of the excessive length of line severed at the posts' edge, e.g., 3 inches.

SUMMARY OF THE INVENTION

The present invention provides a rotating head with a mechanism that extends the cutting line to a suitable operating length whenever it is worn or severed to an undesirable lesser length without interrupting vegetation cutting or requiring independently imposed operator involvement.

In accordance with this invention, there is provided an apparatus for cutting vegetation, such as a flexible line trimmer, which has a head rotatable about an axis of rotation. The head includes a cavity containing a supply of a flexible nonmetallic cutting line that extends outwardly from the head through an aperture into a cutting plane. The pull on the line extending from the head into the cutting plane resulting from centrifugal force is balanced against the centrifugal force acting on a fixed or reference counterweight and the payout of replacement line is controlled by a mechanism responding to the imbalanced centrifugal forces. When no centrifugal force is present, i.e., the head is not rotating, line payout is prevented. When the reference force exceeds the line pull force, i.e., the head is rotating and the line is shorter than the desired length, the line is released for further payout. When the line pull force exceeds the reference force, i.e., the line is at the desired length or greater, additional line payout is prevented. If the head is rotating and the pull on the line subsequently falls below the counterbalance or reference force, i.e., the line is shorter than the desired cutting length, the line is again payed out until the desired length is attained. Any event which artificially increases the line pull, such as snagging of the line on a fence or the like, further overbalances the reference force, ensuring that no line is paid out. Thus, the only operating condition which allows line to extend is a shortening of the line. Since line is released only in response to a centrifugally generated force produced by rotation, the line cannot be extended during start-up. Because the system relies only on counterbalancing centrifugal forces, not spring forces, it is independent of rotational speed or direction of the head, making it suitable for use on both gasoline engines, and electric motor driven devices. Of course, as the line shortens, due to wear, there is a tendency to increase the rotational speed of the head, which increases the centrifugal force of the line and the reference mass as a square function.

In accordance with a very important aspect of the present invention, stability of operation is achieved by providing an enhanced, predictable drag force on the line as it is payed out to maintain full tension on the line at all times, thus ensuring that the centrifugal force on the line can be accurately sensed during all modes of operation. This may be considered as a controlled payout in which the rate of payout is limited so that at all stages during payout, a back tension substantially equal to the centrifugal force on the line is applied to the line as the line is payed out. Otherwise the line has no tension and the centrifugal force cannot be measured by sensing the tension in the line and using this measured force to terminate line payout.

In a preferred embodiment of the present invention, a pivotally supported balancing arm is imbalanced to form a reference mass which is responsive to the centrifugal forces of rotation. The arm effects engagement and disengagement of a drag mechanism which functions to impose a controlled backtension on the line for resisting uncontrolled extension of the line to both ensure that the tension in the line can be sensed at all times and to slow the rate of payout until the mechanism can properly lock the line against further extension at the desired length.

The drag mechanism includes a spool, positioned within the head's housing, upon which the line is wound. A cooperating cam tooth arrangement, formed on the spool and the head housing, forces the spool to reciprocate axially in response to centrifugal force-created payout of the line. The force required to cause the spool to axially reverse directions provides a resistance to line payout which maintains full tension on the line. This allows the centrifugal force on the line to be sensed by the balancing arm, and also slows the payout to enable the mechanism time to respond and stop the line at the appropriate length before excess line has payed out.

The balancing member is formed from a relatively stiff bent metal rod material and has a generally inverted U-shaped configuration defined by first and second parallel, laterally spaced legs whose upper ends are joined by a locking portion having a laterally offset section therein. Extending transversely outwardly from the lower end of the first leg, in a direction generally opposite to the direction in which the second leg is laterally offset from the first leg, is a "pigtail" portion of the balancing arm.

To pivotally mount the balancing member within the cutting head housing an elongated cylindrical metal coil spring member is pushed onto the pigtail, snaked around its juncture with the first leg, and then pushed upwardly onto the first balancing member leg. The installed spring is then laterally press-fitted into a vertical plastic pocket formed within the housing, through a side opening in the pocket, to form a convenient metal bearing for the first balancing member leg about which the balancing member may be pivoted.

The use of this laterally flexible spring element to form such bearing advantageously permits the balancing member to be completely formed prior to the installation of its associated bearing—specifically, a rigid bearing (such as a rigid metal sleeve) does not have to be installed on the first balancing member leg prior to making the pigtail bend therein. Additionally, the unique use of the flexible coil spring member as a bearing provides (via the radially outer surfaces of the spring coils) an enhanced gripping action between the bearing and the plastic pocket without the necessity of externally roughening the bearing or internally roughening the pocket to augment the frictional bearing retaining forces therebetween.

A free end portion of the spooled cutting line is passed outwardly around the second balancing arm leg, generally transversely thereto, and, at a point circumferentially spaced from the second leg, extended outwardy through the outlet aperture in the housing between a pair of metal roll pins press-fitted into appropriate openings therein and defining the outlet aperture's line guard structure. During operative rotation of the cutting head the resulting centrifugal payout force created in the free line end portion exerts a radially inwardly directed force on the second balancing arm leg tending to pivot it inwardly toward the outer side of the spool against a centrifugally generated opposite pivotal force on the balancing arm.

During operative head rotation, when the length of the outwardly projecting free line end portion is at a predetermined operating magnitude, the component of its centrifugal payout force tending to inwardly pivot the second leg holds the laterally offset upper locking portion of the balancing arm over the upper end of the spool to prevent rotation and axial reciprocation of the spool, thereby locking it and preventing line payout.

However, when the outer line end portion becomes sufficiently shortened (through wear or severance) its centrifugal payout force is correspondingly reduced to the point where the centrifugally generated outward pivotal force on the second balancing member leg overcomes the oppositely directed line force thereon and the laterally offset upper locking portion of the balancing arm is swung out of engagement with the upper spool end. This frees the spool to rotate and axially reciprocate to cause centrifugal force-generated line payout against the inertial drag force of the reciprocating spool.

When the free line end portion is re-extended to its predetermined operating length, its inwardly directed force upon the second balancing arm leg is increased sufficiently to again pivot the balancing arm to its spool-locking position in which the laterally offset upper end portion of the balancing overlies and lockingly engages the upper spool end.

The outwardly bent "pigtail" portion of the balancing arm plays a unique dual role in improving the overall operation and design flexibility of the automatic line feed cutting head of the present invention. Specifically, it provides a simple and quite inexpensive means for adjusting the controlled cutting length of a given diameter flexible line, or providing a fixed cutting length for various diameter lines used on the spool, and also functions as a convenient mechanism for permitting manual payout of the cutting line when desired.

As to this first function of the pigtail, during the initial forming of the bent rod balancing arm, the length of its pigtail can be sized to alter the magnitude of the overall centrifugally generated pivotal force of the balancing arm which resists the oppositely directed pivotal force of the cutting line. For example, by providing the pigtail with a first length, the balancing arm (for a given cutting head) will automatically maintain, for a given cutting line diameter, a predetermined outwardly projecting cutting length of the free line end portion. Simply by shortening the pigtail the resulting automatically controlled cutting length of the line is lengthened, and by lengthening the pigtail the resulting automatically controlled cutting length is shortened for the same diameter line. In a similar fashion, the pigtail length may be appropriately varied in the balancing arm manufacturing process to provide, in otherwise identical balancing arms, the same automatically controlled line cutting lengths for lines of different diameters. It can readily be seen that this feature of the present invention considerably simplifies and reduces the overall cost of manufacturing balancing arms for a wide variety of cutting heads adapted to utilize lines of various diameters.

The manual line feed capability provided by the pigtail arises through its cooperation with an inwardly depressable locking tab, formed on the side of housing, which is used to releasably lock a rotatably detachable cover member over the open lower end of the housing. The pigtail is positioned inwardly of the locking tab for engagement thereby when the locking tab is depressed. Such engagement pivots the balancing arm to its unlocked position to permit rotation of the spool and manual extension of the cutting line. This feature is particularly useful in instances where the outer cutting line end portion is suddenly severed during trimmer operation in a manner such that only a very small length of cutting line projects outwardly of the housing aperture—a length too small to cause automatic line extension. This situation is rapidly remedied, without having to remove the bottom cover member, simply by stopping the trimmer, pushing the locking tab, manually extending the cutting line, releasing the locking tab, and restarting the trimmer.

During normal trimmer operation, with the balancing arm in its inwardly pivoted spool-locking position, the line-engaging second leg of the balancing arm is forced inwardly against the peripheries of the upper and lower line spool flanges by the considerable radially inwardly directed component of the centrifugal line payout force. There is also a considerable tangentially directed frictional force imposed on the second leg by the line portion which engages it.

In developing the present invention it was found that in occasional extreme instances, such as when the rapidly whirling outer line end struck a solid, immovable object in a certain manner, this tangential friction force momentarily increased sufficiently to bend the second leg of the balancing arm outwardly from the first leg, while sliding the second leg circumferentially around the upper and lower spool flange peripheries, until the lower end of the second leg became wedged against the upper side surface of the lower spool flange—an event requiring the removal of the lower head cover member to unwedge and reposition the jammed leg.

In the present invention this previous occasional occurrence has been substantially eliminated by the formation, around the upper and lower spool flange peripheries, of circumferentially spaced series of radial notches. The upper flange notches are circumferentially aligned with the lower flange notches in a manner such that with the balancing arm in its spool-locking position upper and lower end portions of the balancing arm's second leg are received in a vertically aligned spool flange notches.

Thus, when high tangential line friction forces are imposed upon the second leg, upper and lower end portions thereof are laterally brought to bear against a pair of spool flange projections bordering the flange notches into which the second leg is pressed by the radially inwardly directed centrifugal line force component. This laterally braces the second leg and prevents its lower end from being outwardly bent and moved circumferentially around the spool and becoming wedged in the spool interior as previously described. In addition to solving the occasionally encountered wedging problem, this unique spool flange configuration also permits the balancing arm to be formed from a thinner diameter, and thus less expensive, rod material.

DETAILED DESCRIPTION

Figures 1, 2:
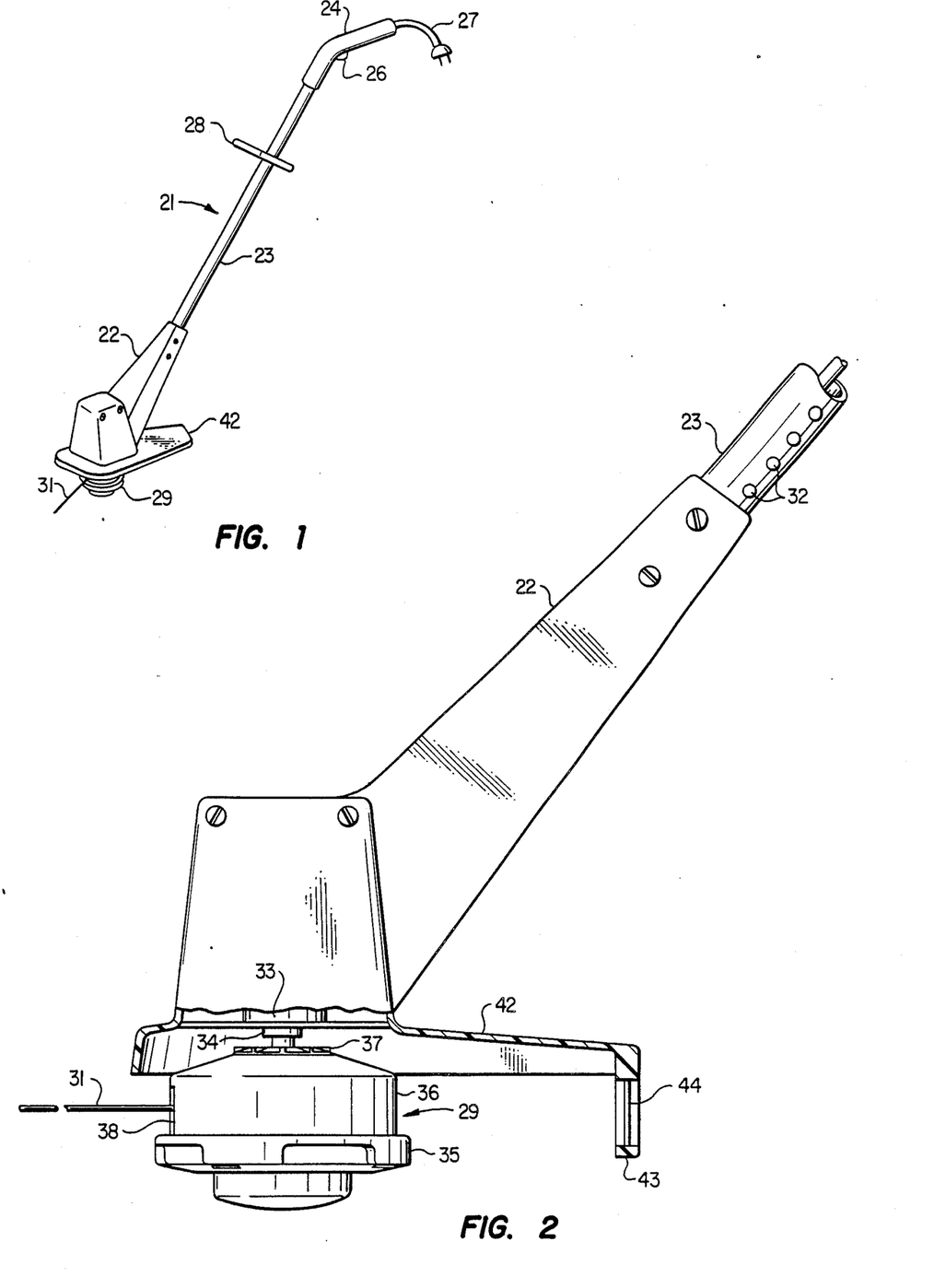
FIG. 1 is a perspective view of a representative electric motor-driven flexible line trimmer incorporating an automatic line feed cutting head of the present invention.
FIG. 2 is an enlarged scale, partially cut away side elevational view of the cutting head end of the trimmer.

Perspectively illustrated in FIG. 1 is an apparatus for cutting vegetation constructed in accordance with the present invention. For purposes of description the apparatus comprises a flexible line type grass trimmer 21, but could be a flexible line type lawnmower, edger or other device for vegetation cutting purposes. The trimmer 21 has a lower housing 22 interconnected by a tube 23 to a handle assembly 24. The assembly 24 provides a switch 26 for selectively applying electrical power received by a cord 27 to an electrical motor carried within the housing 22. For two-handed operation of the trimmer 21, an auxiliary handle 28 is provided upon the tube 23. The lower housing 22 carries a specially designed automatic line feed cutting head 29 which embodies principles of the present invention. Head 29 is rotatable about a generally vertical axis passing through the housing 22, and cutting line 31 extends into a cutting plane which is substantially perpendicular to the axis of rotation of the head.

The housing 22 includes a rearwardly extending tail part 42 which serves to protect the user from inadvertent contact with the rotating cutting line 31. Also, the tail part provides an automatic limit to the extension of cutting line 31 from the head 29. More particularly, the tail part 42 has a downwardly extending projection 43 (FIG. 2) in which a metal cutting blade 44 is carried. As a result, the cutting line 31, when rotated in a cutting plane by the head 29, can never have an operating length extending beyond the blade 44. Any initially greater length of cutting line is automatically severed by the blade 44.

As shown in FIG. 2, an electric motor 33 is operatively disposed within the housing 22 and has a downwardly extending drive shaft 34 to which the head 29 is threadingly connected to be rotationally driven at high speed by the motor 33. Motor 33 is cooled during trimmer operation by cooling vanes 37 formed on the top of the head 29 and operative to draw ambient cooling air inwardly through air induction openings 32 in tube 23 and flow the air downwardly along the motor.

Figure 3:
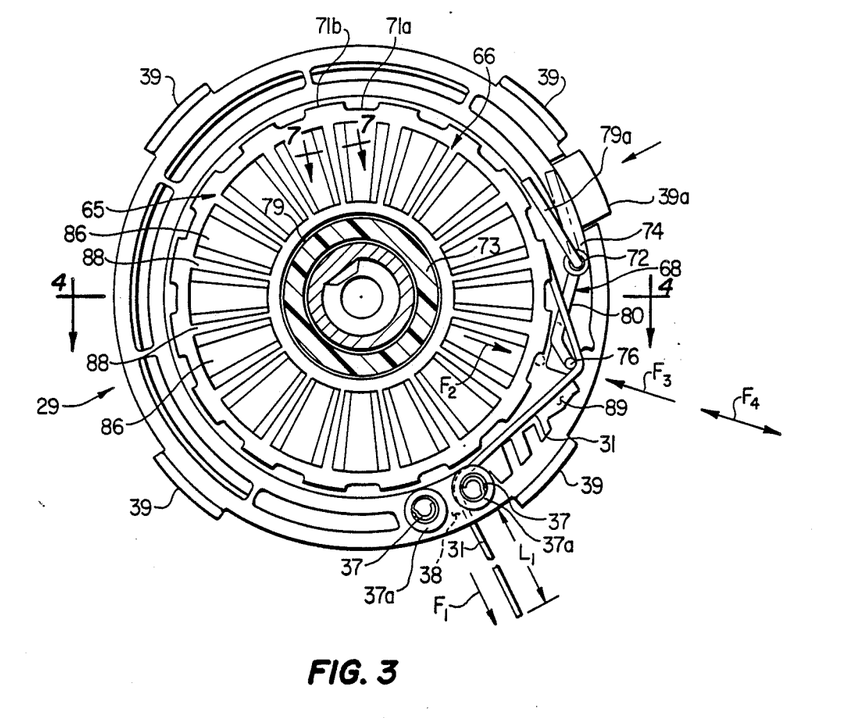
FIG. 3 is a cross-sectional view through the cutting head taken along line 3—3 of FIG. 4.
Figure 4:
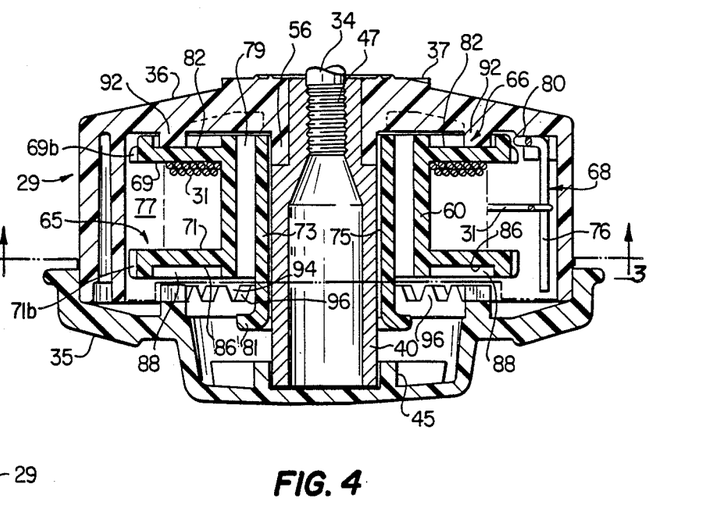
FIG. 4 is a cross-sectional view through the cutting head, taken along line 4—4 of FIG. 3, with a line engaging balancing arm portion thereof in its line release position and the line storage spool in its uppermost position within the head housing.
Figure 5:
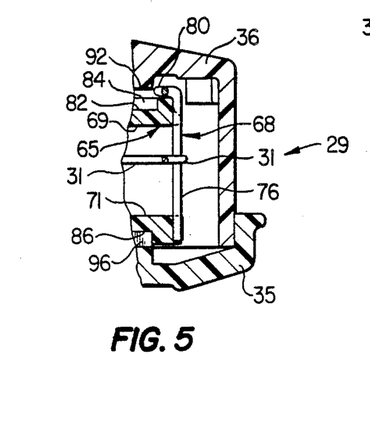
FIG. 5 illustrates a right side portion of the sectioned cutting head in FIG. 4, with the balancing arm in its line locking position and the spool in its lowermost position within the head housing.

Referring now to FIGS. 3-5, the head 29 comprises a molded plastic hollow cylindrical housing or hub 36 having a generally closed upper end and an open bottom end over which is secured a removable molded plastic bottom cover 35. A line outlet aperture 38 is formed through the vertical side wall of hub 36 and has a protective line guard structure therein defined by a spaced pair of metal roll pins 37 which are press-fitted at their opposite ends into suitable openings $37_a$ formed in the upper and lower side surfaces of aperture 38. As best illustrated in FIG. 3, the flexible line 31 is passed outwardly between pins 37 from the interior of hub 36.

The hub 36 is adapted to interfit with cover 35 by means of tabs 39 on the hub and complementary grooves (not illustrated) on the cover. To install the cover 35 over the open lower end of hub 36, the cover is pushed onto the lower hub end and then rotated to cause entry of tabs 39 into the cover grooves. The installed bottom cover 35 is releasably latched in place by operation of a resilient locking tab $39_a$ which may be pushed radially inwardly to permit reverse rotation and removal of cover 35.

An arbor 40 is axially threaded to receive stud 47 from the drive shaft 34 and is secured within the head between downwardly depending tubular cap post 56 in hub 36, and a shoulder formed on the arbor 40. The cover 35 has an annular lip 45 which receives the lower end of the arbor for stability. A line spool indicated generally by the reference numeral 65 contains a storage supply of cutting line 31 and is rotatably and reciprocably supported on arbor 40.

As will now be described, the head 29, during high speed operative rotation thereof by motor 33, functions to automatically pay out cutting line 31 through hub aperture 38 in a manner maintaining the operative cutting length of the line at a predetermined length to compensate for line shortening (through wear and severance of an outer end portion thereof) during trimmer operation. Importantly, this automatic cutting line payout in response to a sensed shortening of its outwardly projecting free end cutting length is achieved at a controlled rate via the operation of what may be termed an inertial angular velocity governor. In a manner subsequently described, the governor maintains tension in line 31 as its passes over a balancing arm member 68 to ensure that the tension in the line can, at all times during trimmer operation, be sensed by the balancing arm.

Referring now to FIGS. 8A-8D, 9 and 10, the balancing arm 68 may be comprised of a stiff metal rod material bent to a generally inverted U-shaped configuration. The arm is formed into an upstanding straight leg 70, and an opposite, generally parallel leg 76. Legs 70, 76 are joined at their upper ends by a locking section 80 of the balancing arm, the section 80 being laterally bent as at $80_a$. A lower end portion of leg 70 is transversely bent, in a direction generally opposite to the direction in which leg 76 is spaced apart from leg 70, to form a pigtail portion $70_a$ of the balancing arm 68.

Figures 6, 7, 8A, 8B, 8C, 8D, 9:
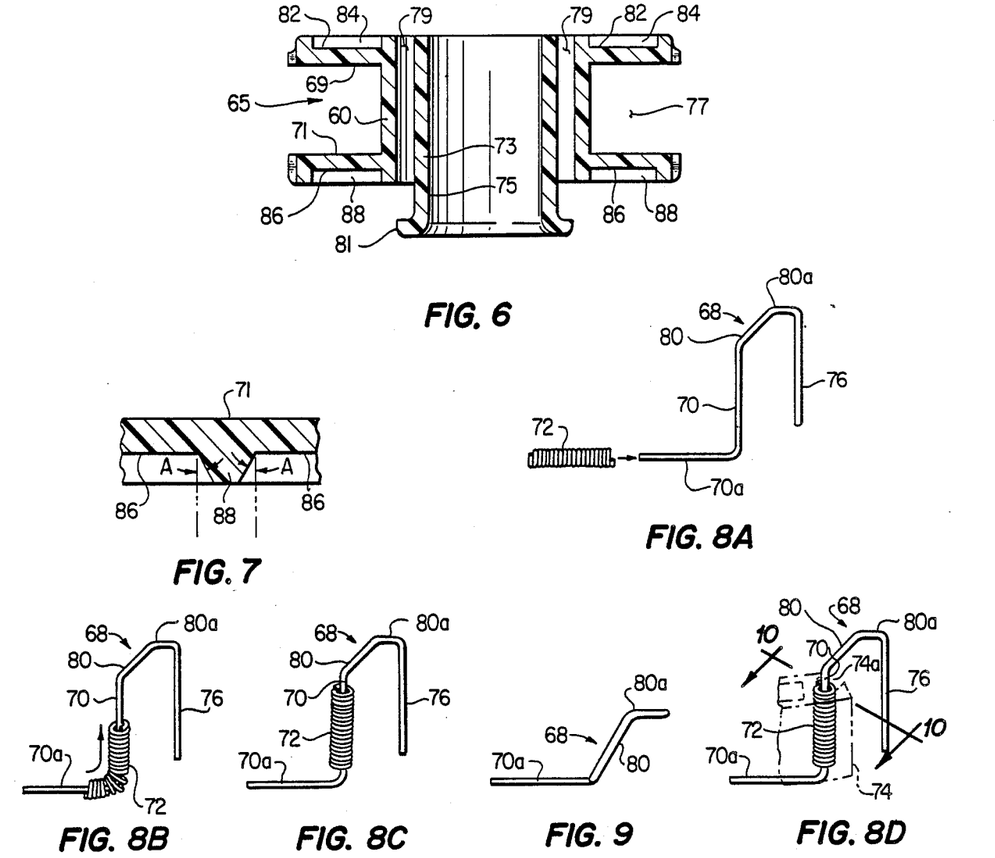
FIG. 6 is a cross-sectional view through the line storage spool removed from the head housing.
FIG. 7 is an enlarged scale cross-sectional view through the bottom end of the spool, taken along line 7—7 of FIG. 3, illustrating a cam tooth formed thereon.
FIGS. 8A-8D are enlarged scale perspective views of the balancing arm sequentially illustrating the installation of a flexible bearing member, thereon, and the press-fitting of the installed bearing member into a phantomed plastic pocket portion positioned in the interior of the head housing.
FIG. 9 is a top plan view of the balancing arm as seen in FIG. 8A.

Prior to installing the balancing arm 68 in the hub 36, a bearing member, in the form of a cylindrical coil spring element 72, is installed on the balancing arm by sliding the spring onto the pigtail $70_a$ (FIG. 8A), snaking the spring around the juncture of leg 70 and pigtail $70_a$ (FIG. 8B), and pushing the spring upwardly onto leg 70 (FIG. 8C). The installed spring 72 is then laterally press-fitted into a plastic pocket 74 formed within hub 36 (see FIGS. 3, 8D and 10), through a side opening $74_a$ in the pocket 74, to position the balancing arm 68 relative to the spool 65 as perspectively illustrated in FIG. 14. The press-fitted spring element 72 thus serves as a journal bearing which permits the balancing arm 68 to be rotated about its leg 70 relative to the spool 65.

Figure 10:
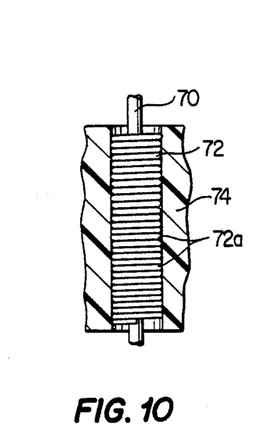
FIG. 10 is an enlarged scale fragmentary cross-sectional view through the plastic pocket portion taken along line 10—10 of FIG. 8D.

The use of the laterally flexible spring element 72 as a bearing member permits the bent rod balancing arm 68 to be completely formed prior to the installation of the necessary bearing member thereon, thereby substantially simplifying the overall construction and installation of the balancing arm. Additionally, as illustrated in FIG. 10, the outer side surfaces $72_a$ of the individual spring coils bear against the inner surface of pocket 74 along discrete stress concentration lines which facilitate the holding of the spring/bearing in place within the pocket and eliminate the necessity of roughening the pocket interior surface or the exterior surface of the bearing to achieve this effect.

As the head 29 is rotated, centrifugal force will tend to urge the balancing arm 68 counterclockwise from the position shown in dotted outline in FIG. 3 (see FIG. 5 also), hereafter referred to as the line locking position, to the position which is shown in FIG. 3 in solid outline, hereinafter referred to as the line release position (see FIG. 4 also). Countering the centrifugal force will be the force $F_3$, which is a vector function of the tension imposed on line 31 that is transmitted to leg 76 and which tends to urge arm 68 from the unlocked position to the locked position.

Spool 65, as will be described with specific reference to FIGS. 3-7, is comprised of a tubular sleeve 73 having a central bore 75 adapted to be rotationally and reciprocably supported in a freely movable fit about arbor 40 which, as illustrated in FIG. 4, is threaded onto an externally threaded downward extension 47 of driveshaft 34. The lower distal end of the sleeve 73 is enlarged to define a spool extraction knob 81 which permits a user to conveniently remove the spool from the head for servicing. Joined to the sleeve is a drum 60 that includes annular concentric upper and lower spool flanges 69 and 71 between which is formed an intervening cavity 77 for containment of a wound supply of coiled line 31. Formed in the top surface of flange 69 is a plurality of uniformly spaced chamfered recesses 82 (see FIGS. 4 and 11-13A) which form intermediate each adjacent pair of recesses a slope sided tooth cam 84. Similarly formed in the underside of flange 71 are a plurality of similar recesses 86 defining intervening slope sided cam teeth 88 which are in a registered alignment with the upper cam teeth 84. Generally separating the sleeve 73 from the drum 60 (FIGS. 3 and 6) are a plurality of arcuate axially extending recesses 79. Line 31 on drum 60 extends through peripheral hub cavity 89 for routing about the leg 76 of balancing arm 68 and then outwardly through aperture 38 between roll pins 37 (see FIGS. 3 and 14).

Spaced apart chamfered recesses 82, 86 and intervening slope sided cam teeth 84, 88 respectively of spool 65 are positioned to cooperate with recesses 90 (see FIGS. 11–13A) between cam teeth 92 formed on the underface interior of hub 36 and recesses 94 between cam teeth 96 formed on the inside surface of cover 35. While cam teeth 84 and 88 of the spool are intended to be aligned as previously mentioned, cam teeth 92 and 96 of the cover and hub respectively are intended to be relatively misaligned to effect axial reciprocation of the spool as will presently be described. The alignment and misalignment arrangement of the cam teeth could in the alternative be reversed or utilized in a combination thereof.

For understanding operation of the inertial angular velocity governor 66, it should be noticed in FIG. 7 that the profiles of the cam teeth are symmetrically formed at a slope angle "A" so that lockup between cam teeth cannot occur in the course of engagement and disengagement. The angle "A" may for example be about 30 degrees which ensures a sliding condition between teeth in contact so that the opposing cam teeth will bias the spool axially alternatively upwardly and downwardly in sliding relationship. The sequence by which the opposing cam teeth engage and disengage can be best understood by following the repetitive sequence of operations schematically depicted in FIGS. 11–13A as subsequently described. It will be presumed for purposes of discussion that cover 35 and hub 36 are rotating in the direction of arrow 98 and that the spool 65 is rotated by tension in the line 31 (during line payout) in a direction represented by arrow 100. As the spool 65 is urged by line tension resulting from centrifugal force to rotate in the direction 100, the upper and lower spool cam teeth 84 and 88 will alternatively operate between the opposing misaligned cam teeth 92 and 96 of hub and cover respectively, causing the spool to reciprocate axially.

The balancing arm 68 (FIG. 3) forms an imbalanced reference mass which is subject to the centrifugal force $F_2$ due to rotation which tends to cause a pivotal movement of the arm counterclockwise from the locked position shown in dotted outline in FIG. 3 to the unlocked position shown in solid outline. It can be seen that the centrifugal force $F_2$ is equal to the difference between the centrifugal force acting on the balancing arm leg portions 76 and 80 tending to rotate the balancing arm in a counterclockwise direction, and the opposite, lesser centrifugal force on pigtail $70_a$ tending to rotate the balancing arm in a clockwise direction.

The counter force vector $F_3$ resulting from tension in the line 31 acts on the balancing arm leg 76 in a direction tending to pivot the balancing arm clockwise from the unlocked position to the locked position. When the balancing arm is in the locked position, the locking portion 80 of the arm is between the upper flange 69 of spool 65 and the hub 36 as shown in FIG. 5 and the spool cannot move upwardly and is locked by the interacting lower cam teeth 88 on the spool and the cam teeth 96 in the cover 35. When line is to be payed out, the centrifugal reference force $F_2$ produced by the imbalance reference mass of the pivoted arm 68 overcomes the counter force $F_3$ of the line acting on the arm 68 and the arm is pivoted outwardly beyond the circumference of upper spool flange 69, enabling vertical reciprocation of the spool and thus rotation of the spool to permit it to precisely and inertially control and retard line payout.

Figure 11:
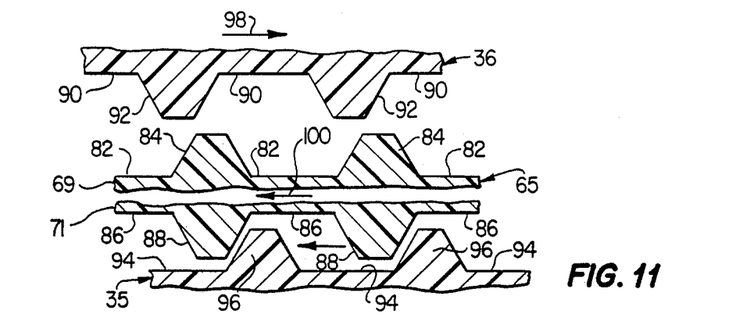
FIGS. 11-13A are schematic cross-sectional representations of the sequential steps of operation of cooperating cam teeth formed on opposite ends of the spool, and within the head housing, with the spool being axially foreshortened for illustrative purposes.
Figure 12:
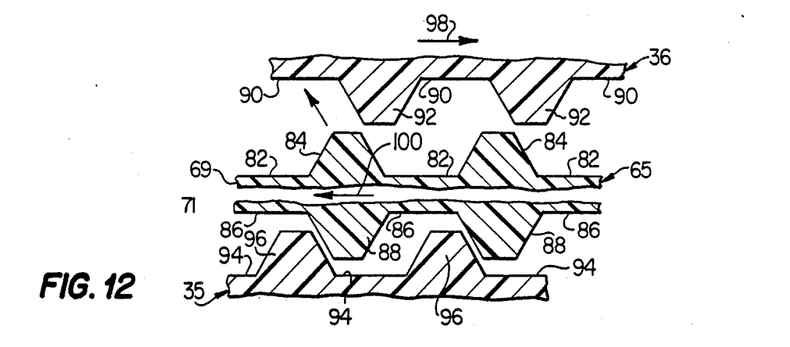
Figure 13:
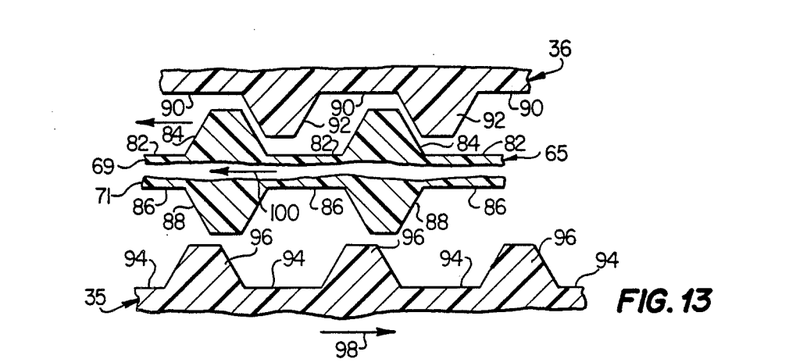
Figure 13A:
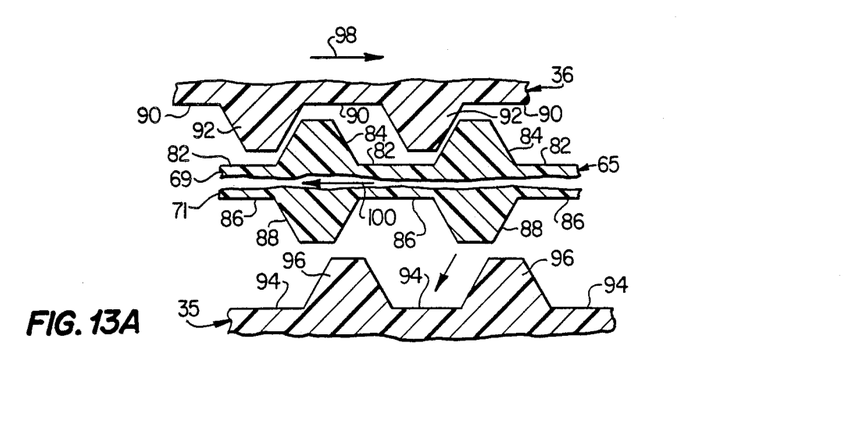

Beginning with the spool arrangement of FIG. 11, in which arm 68 is presumed to be in the unlocked position, the lower spool cam teeth 88 are bottomed out in cover recesses 94 for incremental rotation in the direction 100 until engagement with the next successive cam teeth 96 of the cover 35. As shown in FIG. 12, the cam teeth 88 will then slide upwardly along the mating sloping faces of cam teeth 96 until clear of cam teeth 96. As the spool reciprocates upwardly toward its position in FIG. 13, upper spool cam teeth 84 penetrate hub recesses 90 until cam teeth 88 have cleared cam teeth 96. By that time cam teeth 84 have rotationally advanced incrementally to the next succeeding cam teeth 92 on the hub 36 (FIG. 13A). This sequence is repetitive as the cam teeth of spool 65 sequentially advance, engage and slide vertically. Consequently, as each spool cam tooth bottoms out and is arcuately displaced in the opposing hub or cover recess, the subsequent sliding displacement between mutually engaging cam teeth forces the spool in the opposite axially direction. The friction between the sliding cam teeth to some extent, but far more importantly, the energy required to accelerate the spool reciprocally along the axis ensures that a back force is maintained on the line at all times, and the greater the line pull, the greater the force required to axially accelerate the spool, and the greater the back tension. This ensures that the tension in the line during payout is equal to that resulting from the centrifugal force on the line, at least on a high frequency, intermittent tension, so that this force producing tension in the line can be balanced against the centrifugal force action on the reference mass of the pivoted balanced arm.

For an understanding of the forces involved by which the spool 65 is activated and deactivated in the aforesaid manner, attention is again directed to FIG. 3 from which it will be appreciated that the tension force $F_1$ is that resulting from centrifugal force on the line 31 which is maintained by the fact that the spool is either secured against rotation, or retarded during line payout by the inertial and frictional effects produced by the interacting cam teeth. The force $F_4$ represents the net difference between the vector force $F_3$ of the tension in line 31 and the centrifugal reference force $F_2$ on the reference mass of arm 68. In the relationship illustrated in FIG. 3, line 31 outward of aperture 38 is assumed to be at the predetermined maintained length $L_1$ such that for purposes of discussion, the tension counter force $F_3$ of line 31 being imposed on arm 68 exceeds the centrifugal force $F_2$ on the arm so that the net force $F_4$ is leftwardly directed as viewed in FIG. 3. The arm 68 is therefore in locked position to prevent reciprocation and therefore a rotation of the spool so that the spool 64 is locked to prevent payout of the line.

As the outwardly extended length of line 31 begins to wear, or should breakage of the line occur, the centrifugal payout force $F_1$ on the line 31 and therefore the counter force $F_3$ from the line will be reduced until the centrifugal reference force $F_2$ on the arm 68 overbalances the counter force $F_3$ of the line at which point the net force $F_4$ becomes rightwardly directed as viewed in FIG. 3 and the arm will pivot outwardly to release the spool. The spool is then accelerated axially first upwardly, then downwardly while maintaining a resistive drag or back tension force on the line. A particularly significant high back tension force is produced when successive cam teeth are engaged after short rotation and at the start of axial acceleration. This ensures that if the outwardly projecting line length is such as to cause the force $F_3$ to overbalance the centrifugal force $F_2$ on the arm, the arm will in fact be pivoted inwardly and again lock the spool to prevent further payout of the line. If not, the spool will continue to reciprocate, rotate and pay out line until the force $F_3$ of the line 31 moves the balance arm 68 to its inward locking position.

It is significant to note that the payout of the line 31 is essentially independent of the rotational speed of the head because any increase in centrifugal payout force $F_1$ on the line 31 due to a speed increase is counterbalanced by a corresponding increase in centrifugal reference force $F_2$ acting on the reference mass of the balance arm 68. Thus the device functions well on a unit driven by a gasoline engine, which due to rich fuel, fouled spark plugs or the like, may vary over a significant r.p.m. range, yet which does not tend to change r.p.m. due to line loss. Yet the device also functions on an electric powered unit where r.p.m. may increase substantially as the line 31 shortens. It is also important to notice that line 31 cannot payout while the head is stationary, because only rotation of the head causes the balance arm 68 to unlock the spool 65. Further, should the line 31 snag on a chain link fence or the like, the excessive force will always overcome the centrifugal force on the balance arm 68 and insure that the spool is locked against rotation.

The provision on the balancing arm 68 of the transverse pigtail portion $70_a$ serves two unique and important functions in the overall operation of the cutting head 29. First, with reference to FIG. 3, it can be seen that when the balancing arm 68 is in its dotted line locking position the outer end of pigtail $70_a$ is positioned against the interior side surface of the resilient locking tab $39_a$. In certain instances the need need may arise to manually extend the cutting line 31 when the balancing arm 68 is in its line locking position. It can readily be seen that such manual extension cannot be achieved simply by pulling on the free end of the line since this would simply push the balancing arm toward its locking position. However, by simply pushing the locking tab $39_a$ inwardly against the pigtail $70_a$, and holding it in its depressed position, the balancing arm is pivoted to its solid line release position to permit the line 31 to be manually extended without removing the lower cover member 35. Release of locking tab $39_c$ returns the head to normal automatic line feed control by balancing arm 68.

The other function provided by the pigtail $70_a$ is the ability to easily adjust the controlled cutting length of the line 31 by appropriately selecting the length of the pigtail during the manufacturing of the balancing arm 68. As previously mentioned, the force $F_2$ (FIG. 3) represents the difference between the centrifugal force imposed on the balancing arm portions 76 and 80 tending to pivot the arm in a clockwise direction, and the lesser, opposite centrifugal force imposed on the pigtail tending to pivot the balancing arm in a clockwise direction. Thus, by shortening the pigtail, the magnitude of net force $F_2$ is increased, while lengthening the pigtail decreases net force $F_2$.

Accordingly, by shortening the pigtail $70_a$ the controlled cutting length of the illustrated line 31 would be lengthened (i.e., its cutting "swath" would be increased), and by lengthening the pigtail the controlled line cutting length would be decreased. This, of course, permits the same cutting head to be used on trimmers (using the same diameter line) having varying lengths between the head and the cutoff blade 44 FIG. 2).

Appropriate variation of pigtail length, during balancing arm manufacture, also permits the maintenance of a fixed line cutting length where different diameter lines are used. For example, if the diameter of the illustrated line 31 were reduced, the same controlled line cutting length L, could be maintained simply by lengthening pigtail $70_a$. If the diameter of line 31 was increased, the same cutting length L, could be maintained by appropriately shortening the pigtail.

Figure 14:
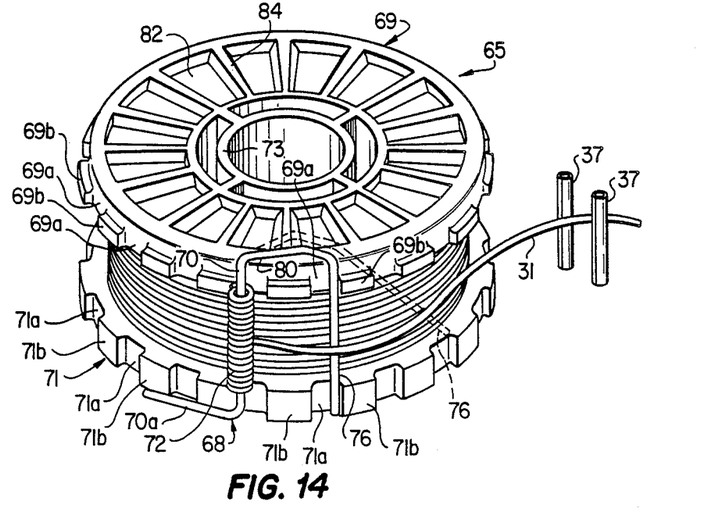
FIG. 14 is a perspective view of the spool and the balancing arm, and illustrates the cooperation between the balancing arm and peripheral flange notches on the spool when the balancing arm is in its line locking position.

Referring now to FIG. 14, it can be seen that when the balancing arm 68 is in its line locking position the radially inwardly directed line force on leg 76 presses upper and lower end portions of leg 76 respectively against the outer peripheries of the upper and lower spool flanges 69 and 71. In developing the present invention it was found that during high speed head rotation the line 31 also exerts a considerable tangential frictional force on leg 76 tending to bend it rightwardly from its normal upright position shown in FIG. 14.

During occasional extreme conditions, such as when the outer end of line 31 struck a solid immovable object such as a post or the like, this tangential force was sufficient to bend leg 76 to its dotted line position in which the lower end of leg 76 was moved rightwardly and inwardly to an extent such that its lower end became wedged against the upper side surface of the lower spool flange 71. This required that the head be disassembled to reposition or replace the balancing arm 68.

In the present invention this potential wedging problem is substantially eliminated by forming circumferentially spaced series of radial notches $69_a$ and $71_a$ in the peripheries of the upper and lower spool flanges 69, 71. The upper and lower series of notches $69_a$, $71_a$ are circumferentially aligned with one another and define on the upper and lower flanges 69, 71 aligned series of circumferentially spaced teeth $69_b$, $71_b$.

During trimmer operation, with the balancing arm 68 in its line locking position, the radially inwardly directed line force on leg 76 forces upper and lower end portions thereof into vertically aligned spool flange notches $69_a$, $69_b$ as illustrated in FIG. 14. In this manner, the tangential frictional line force on leg 76 forces its upper and lower end portions against the tooth pair $69_b$, $71_b$ at the right sides of the leg-receiving notches. This braces the received upper and lower end portions of the leg 76 to thereby prevent rightward deflection of the leg toward the dotted line "wedged" position thereof, thereby substantially eliminating the previously discussed potential leg wedging problem. The leg bracing function of the spool flange teeth $69_b$, $71_b$ also permits the balancing arm 68 to be formed from a thinner, and thus less expensive metal rod material.

The foregoing detailed description is to be clearly understood as being given by way of illustration and example only, the spirit and scope of the present invention being limited solely by the appended claims.

What is claimed is:

1. Vegetation cutting apparatus comprising:
   head means, rotatable about an axis, for holding a stored quantity of flexible line including an outer line end portion of a predetermined length rotatable by said head means in a cutting plane projecting outwardly therefrom to create in the outer line end portion a centrifugal payout force tending to pull additional line outwardly from said head means, said head means including a housing having a bearing pocket formed therein;

drive means selectively operable to rotate said head means about said axis; and automatic line feed means, carried by said head means and responsive to rotation thereof, for sensing a shortening of said outer line end portion and responsively paying out line to relengthen said outer line end portion to said predetermined length, said automatic line feed means including a generally U-shaped balancing member having:

a first leg portion having an upper end, a lower end, and a projecting portion extending transversely from said second end, said first leg portion extending generally parallel to said axis, a second leg portion parallel to and spaced laterally apart from said first leg portion in a direction generally opposite to the direction that said projecting portion extends from said lower end of said first leg portion, said second leg portion having an upper end and a lower end, a locking portion extending between and intersecuring said upper ends of said first and second leg portions, a cylindrical coil spring element coaxially circumscribing said first leg portion between said first and second ends thereof, and being press-fitted into said bearing pocket to serve as a bearing to permit said balancing member to pivot relative to said head means about said first leg portion, said locking portion and said second leg portion being sized relative to said projecting portion in a manner such that rotation of said head means imposes a net centrifugal force on said balancing member which tends to pivot said second leg portion radially outwardly relative to said first leg portion to a line release position in which said balancing member permits said centrifugal line payout force to cause line payout, said second leg portion being engageable by said flexible line in a manner exerting a generally radially inwardly directed line payout force component on said second leg portion tending to pivot it radially inwardly relative to said first leg portion to a line locking position in which said locking portion of said balancing member cooperates with a portion of said head means to prevent line payout.

2. The vegetation cutting apparatus of claim 1 wherein:

said balancing member is formed from a length of relatively stiff metal rod bent to shape, the use of said cylindrical coil spring element as a bearing member permitting the bearing element to be installed on the fully bent balancing member by sliding the spring element onto said projecting portion, bending the spring element around the juncture between said first leg portion and said projecting portion, and then pushing said spring element onto said first leg portion.

3. The vegetation cutting apparatus of claim 1 wherein:

said head means include a spool member, carried within said housing for rotation relative thereto, about which the stored quantity of flexible line may be wrapped, and said locking portion of said balancing member, when said balancing member is in said line locking position, is brought into engagement with said spool member in a manner precluding spool member rotation.

4. The vegetation cutting apparatus of claim 3 wherein:

said apparatus further comprises means for causing said spool member to simultaneously rotate and axially reciprocate during line payout, and said locking portion of said balancing member, when said balancing member is in its line locking position, is interposed between an end of said spool member and a facing portion of said housing and prevents said spool member from rotating and axially reciprocating.

5. The vegetation cutting apparatus of claim 4 wherein:

said means for causing said spool member to simultaneously rotate and axially reciprocate during line payout include cooperating cam teeth formed on opposite ends of said spool member and facing portions of said housing.

6. The vegetation cutting apparatus of claim 1 further comprising:

bracing means for inhibiting line force-generated bending of said second leg portion of said balancing member, in a generally tangential direction relative to said cutting plane, during head means rotation with said balancing member in its line locking position.

7. The vegetation cutting apparatus of claim 6 wherein:

said head means include a spool member, carried within said housing for rotation relative thereto, about which the stored quantity of flexible line may be wrapped, said spool member having upper and lower flanges, and said bracing means include series of circumferentially spaced radial notches formed in the peripheries of said upper and lower flanges and adapted to receive upper and lower end portions of said second leg portion of said balancing member when said balancing member is in its line locking position.

8. The vegetation cutting apparatus of claim 1 further comprising:

means permitting selective manual payout of said flexible line from said head means.

9. The vegetation cutting apparatus of claim 8 wherein:

said means permitting selective manual payout include a deformable portion of said housing which may be moved into engagement with said projecting portion of said balancing member to pivot said balancing member from its line locking position to its line release position.

10. The vegetation cutting apparatus of claim 9 wherein:

said housing has an open lower end covered by a cover member releasably held in place by a radially deformable locking tab member formed on said housing, and said deformable portion of said housing comprises said locking tab member.

11. A method of rotationally supporting in a bearing pocket structure an essentially straight central portion of a member having outwardly bent first and second opposite end portions, said method comprising the steps of:

providing a tubular coil spring member;

installing said coil spring member on said central portion by sequentially sliding said spring member onto said first end portion, bending said spring member around the juncture between said first end portion and said central portion, and pushing said spring member onto said central portion to position the opposite ends of said spring member between said outwardly bent first and second end portions; and press-fitting the installed spring member into said bearing pocket structure.

12. The method of claim 11 wherein:

said bearing pocket structure is formed from a plastic material, and said providing step is performed by providing a tubular metal coil spring member.

13. A method of fabricating an automatic line feed cutting head for a flexible line vegetation cutting apparatus comprising the steps of:

providing a housing having a bearing pocket therein;

forming a balancing member for use in sensing the length of flexible line projecting outwardly from said housing during operation of the apparatus and responsively controlling line payout to automatically maintain said length at a predetermined magnitude, said balancing member having an essentially straight first portion with first and second ends, a second portion projecting outwardly from said first end at an angle relative to said first portion, and a third portion projecting outwardly from said second end at an angle relative to said first portion;

providing a tubular coil spring member;

installing said spring member on said first portion of said balancing member by inserting one of said second and third portions into said spring member and snaking said spring member along said one of said second and third portions, around the juncture of said one of said second and third portions with said first portion, and coaxially onto said first portion; and pivotally mounting said balancing member on said housing by press-fitting the installed spring member into said bearing pocket.

14. The method of claim 13 wherein:

said forming step is performed by providing a length of metal rod material, bending the rod to a generally U-shaped configuration in which one of the U-legs has, at its outer end, a transversely projecting portion, and said installing step is performed by inserting said transversely projecting portion into said spring member and snaking said spring member around the juncture between said one of the U-legs and said transversely projecting portion and onto said one of the U-legs.

15. The method of claim 14 wherein:

said step of providing a housing is performed by providing a housing having a plastic bearing pocket therein, and said step of providing a tubular coil spring member is performed by providing a metal tubular coil spring member.

16. Vegetation cutting apparatus comprising:

head means, rotatable about an axis, for holding a stored quantity of flexible line including an outer line end portion of a predetermined length rotatable by said head means in a cutting plane projecting outwardly therefrom to create in the outer line end portion a centrifugal payout force tending to pull additional line outwardly from said head means, said head means including a spool member about which the stored quantity of flexible line may be wrapped, said spool member having first and second flange portions with circumferentially spaced series of radial notches formed in their peripheries;

drive means selectively operable to rotate said head means about said axis; and automatic line feed means, carried by said head means and responsive to rotation thereof, for sensing a shortening of said outer line end portion and responsively permitting said centrifugal payout force to pull additional line from said spool member to relengthen said outer line end portion to said predetermined length, and then terminating further line payout when said outer line end portion is relengthened to said predetermined length, said automatic line feed means including a balancing member having:

a mounting portion pivotally carried by said head means, and a line engaging portion secured to said mounting portion and adapted to be engaged by a portion of the flexible line and pivoted between a line release position and a line locking position in which spaced apart sections are received in an axially aligned pair of said peripheral spool flange notches to brace said line engaging portion against line force deflection in a direction generally tangential to said spool member flanges.

17. Vegetation cutting apparatus comprising:

head means, rotatable about an axis, for holding a stored quantity of flexible line including an outer line end portion of a predetermined length rotatable by said head means in a cutting plane projecting outwardly therefrom to create in the outer line end portion a centrifugal payout force tending to pull additional line outwardly from said head means;

drive means selectively operable to rotate said head means about said axis; and automatic line feed means, carried by said head means and responsive to rotation thereof, for sensing a shortening of said outer line end portion and responsively permitting said centrifugal payout force to pull additional line from said spool member to relengthen said outer line end portion to said predetermined length, and then terminating further line payout when said outer line end portion is relengthened to said predetermined length, said automatic line feed means including a balancing member having:

a first leg portion extending generally parallel to said axis and journalled in said head means, a second leg portion secured to said first leg portion in a spaced apart, parallel relationship therewith, said second leg portion being engageable by a portion of the flexible line and adapted to receive a first centrifugal force, during head means rotation, tending to pivot said second leg portion in a first direction about said first leg portion, and a component of said centrifugal line payout force tending to pivot said second leg portion in an opposite direction about said first leg portion, and a third leg portion extending outwardly from said first leg portion, at an angle relative thereto and generally away from said second leg portion, and adapted to receive a second centrifugal force, during head means rotation, tending to pivot said second leg portion in said opposite direction about said first leg portion, said third leg portion having a length which may be sized to controllably vary the magnitude of said predetermined length of said outer line end portion of said flexible line, or to maintain said predetermined length for a flexible line having a different diameter.

18. The vegetation cutting apparatus of claim 17 wherein:
   said head means have a bearing pocket formed therein, and
   said first leg portion is journalled in said head means by a tubular coil spring member coaxially circumscribing said first leg portion and press-fitted into said bearing pocket.

19. The vegetation cutting apparatus of claim 18 wherein:
   said bearing pocket is of a plastic material, and
   said spring member is of a metal material.

* * * * *